(12) United States Patent
Osada

(10) Patent No.: US 12,293,777 B2
(45) Date of Patent: May 6, 2025

(54) MAGNETIC TAPE CARTRIDGE AND LABEL FOR MAGNETIC TAPE CARTRIDGE IDENTIFICATION

(71) Applicant: FUJIFILM CORPORATION, Tokyo (JP)

(72) Inventor: Yoshihiko Osada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/442,024

(22) Filed: Feb. 14, 2024

(65) Prior Publication Data
US 2024/0282340 A1 Aug. 22, 2024

(30) Foreign Application Priority Data
Feb. 22, 2023 (JP) .................. 2023-026735

(51) Int. Cl.
| | |
|---|---|
| G11B 15/61 | (2006.01) |
| G02B 5/02 | (2006.01) |
| G11B 5/78 | (2006.01) |
| G11B 15/18 | (2006.01) |
| G11B 23/40 | (2006.01) |

(52) U.S. Cl.
CPC ............ *G11B 23/40* (2013.01); *G02B 5/0226* (2013.01); *G11B 5/78* (2013.01)

(58) Field of Classification Search
CPC . G11B 15/615; G11B 15/1883; G11B 33/121; G11B 33/04; G11B 23/027; G06K 1/121; G06K 19/06037; G06K 19/06028; G06K 19/06056
USPC ............................................. 360/93
See application file for complete search history.

(56) References Cited

U.S. PATENT DOCUMENTS

| 11,080,494 B2 * | 8/2021 | Osako ............. G06K 19/06028 |
| 2002/0051413 A1 | 5/2002 | Choi et al. |
| 2020/0311355 A1 | 10/2020 | Osako et al. |

FOREIGN PATENT DOCUMENTS

| JP | H08-230967 A | 9/1996 |
| JP | 2002-157853 A | 5/2002 |
| JP | 2020-161199 A | 10/2020 |

* cited by examiner

*Primary Examiner* — Nabil Z Hindi
(74) *Attorney, Agent, or Firm* — SOLARIS Intellectual Property Group, PLLC

(57) ABSTRACT

A magnetic tape cartridge includes a label provided on a front surface of a case, the label includes a coat layer that is formed on a front surface of a substrate attached to the case and scatters light reflected by the label with control of a surface shape and on which an identifier for identifying the magnetic tape cartridge is printed, and with the control of the surface shape, the coat layer has an average period of surface protrusions is equal to or smaller than 400 μm.

9 Claims, 13 Drawing Sheets

MAGNETIC TAPE CARTRIDGE AND LABEL FOR MAGNETIC TAPE CARTRIDGE IDENTIFICATION

CROSS-REFERENCE TO RELATED APPLICATION

This application claims priority from Japanese Patent Application No. 2023-026735, filed Feb. 22, 2023, the disclosure of which is incorporated herein by reference in its entirety.

BACKGROUND

Technical Field

A technique of the present disclosure relates to a magnetic tape cartridge and a label for magnetic tape cartridge identification.

Related Art

JP1996-230967A (JP-H8-230967A) describes a label seal 1 that is attached to a tape cassette or a case for cassette storage. The label seal 1 has a light emitting layer formed by printing luminous ink 3 on a seal base 2 with a back surface as a pressure-sensitive adhesive surface 2a, and further has a coating layer formed by coating a film 4 with a front surface as a rough surface 4a on the light emitting layer. Because the front surface of the film 4 is the rough surface 4a, in a case where characters are written on the front surface, a scratching condition of writing instrument is appropriate, so that satisfactory writability is obtained. Then, in a case where surroundings become dark, the luminous ink 3 of the light emitting layer illuminates, and the characters written on the film 4 are clearly viewed with the backlight effect.

JP2020-161199A describes a recording tape cartridge comprising a case that is configured by a first half in which a first peripheral wall is erected around a top plate and a second half in which a second peripheral wall is erected around a bottom plate being bonded to each other in a state in which the first peripheral wall and the second peripheral wall are butted against each other, and accommodates a reel on which a recording tape is wound, and a label surface configured with a first half label surface of the first peripheral wall and a second half label surface of the second peripheral wall on an opposite side to a loading direction of the case into a drive device, in which a one-dimensional or two-dimensional barcode on which individual identification information is recorded is printed only on the first half label surface or the second half label surface.

JP2002-157853A describes a disk cartridge comprising a disk that is an information recording medium, and a case that rotatably stores the disk, in which the case is provided with a reflective portion that reflects incident light to a predetermined photodetector to allow the type of the disk to be identified based on a difference in reflected light.

SUMMARY

An embodiment according to the technique of the present disclosure provides a magnetic tape cartridge and a label for magnetic tape cartridge identification capable of suppressing the occurrence of reading failure in reading an identifier printed on a label of a magnetic tape cartridge.

A first aspect according to the technique of the present disclosure is a magnetic tape cartridge comprising a label provided on a front surface of a case, in which the label includes a coat layer that is formed on a front surface of a substrate attached to the case and scatters light reflected by the label with control of a surface shape and on which an identifier for identifying the magnetic tape cartridge is printed, and with the control of the surface shape, the coat layer has an average period of surface protrusions is equal to or smaller than 400 µm.

A second aspect according to the technique of the present disclosure is the magnetic tape cartridge according to the first aspect, in which, with the control of the surface shape, the coat layer has a surface protrusion height equal to or greater than a predetermined value in a surface protrusion height distribution.

A third aspect according to the technique of the present disclosure is the magnetic tape cartridge according to the second aspect, in which the coat layer has the surface protrusion height equal to or greater than 10 µm in the surface protrusion height distribution.

A fourth aspect according to the technique of the present disclosure is the magnetic tape cartridge according to the first aspect, in which, with the control of the surface shape, the coat layer has glossiness equal to or smaller than 7.

A fifth aspect according to the technique of the present disclosure is the magnetic tape cartridge according to the first aspect, in which the control of the surface shape includes addition of particles to the coat layer, and the particles have an average particle diameter equal to or greater than 10 µm.

A sixth aspect according to the technique of the present disclosure is the magnetic tape cartridge according to the fifth aspect, in which the particles are $SiO_2$ particles.

A seventh aspect according to the technique of the present disclosure is the magnetic tape cartridge according to the first aspect, in which the identifier includes a one-dimensional image and/or a two-dimensional matrix image.

An eighth aspect according to the technique of the present disclosure is a label for magnetic tape cartridge identification comprising a substrate attached to a case of a magnetic tape cartridge, and a coat layer that is formed on a front surface of the substrate and scatters light reflected by the label for magnetic tape cartridge identification with control of a surface shape and on which an identifier for identifying the magnetic tape cartridge is printed, in which, with the control of the surface shape, the coat layer has an average period of surface protrusions equal to or smaller than 400 µm.

A ninth aspect according to the technique of the present disclosure is a cartridge identification label for attachment to a case of a magnetic tape cartridge, the label comprising a coated layer on which an identifier is printed, the coat layer satisfying at least one of the following (a) to (c), (a) an average interval of surface protrusions is equal to or smaller than 400 µm, (b) a protrusion height distribution includes protrusion heights equal to or higher than 10 µm, or (c) glossiness is equal to or smaller than 7.

DETAILED DESCRIPTION

An example of an embodiment of a magnetic tape cartridge according to the technique of the present disclosure will be described with reference to the accompanying drawings.

First, terms that are used in the following description will be described.

NVM is an abbreviation for "Non-Volatile Memory". CPU is an abbreviation for "Central Processing Unit". GPU is an abbreviation for "Graphics Processing Unit". RAM is an abbreviation for "Random Access Memory". EEPROM is an abbreviation for "Electrically Erasable and Programmable Read Only Memory". EL is an abbreviation for "Electronic Luminescent". LCD is an abbreviation for "Liquid Crystal Display". SSD is an abbreviation for "Solid State Drive". HDD is an abbreviation for "Hard Disk Drive". USB is an abbreviation for "Universal Serial Bus". ASIC is an abbreviation for "Application Specific Integrated Circuit". FPGA is an abbreviation for "Field-Programmable Gate Array". SoC is an abbreviation for "System-On-Chip". PLC is an abbreviation for "Programmable Logic Controller". IC is an abbreviation for "Integrated Circuit". RFID is an abbreviation for "Radio Frequency IDentifier". CCD is an abbreviation for "Charge-Coupled Device". LED is an abbreviation for "Light-Emitting Diode".

Figure 1:
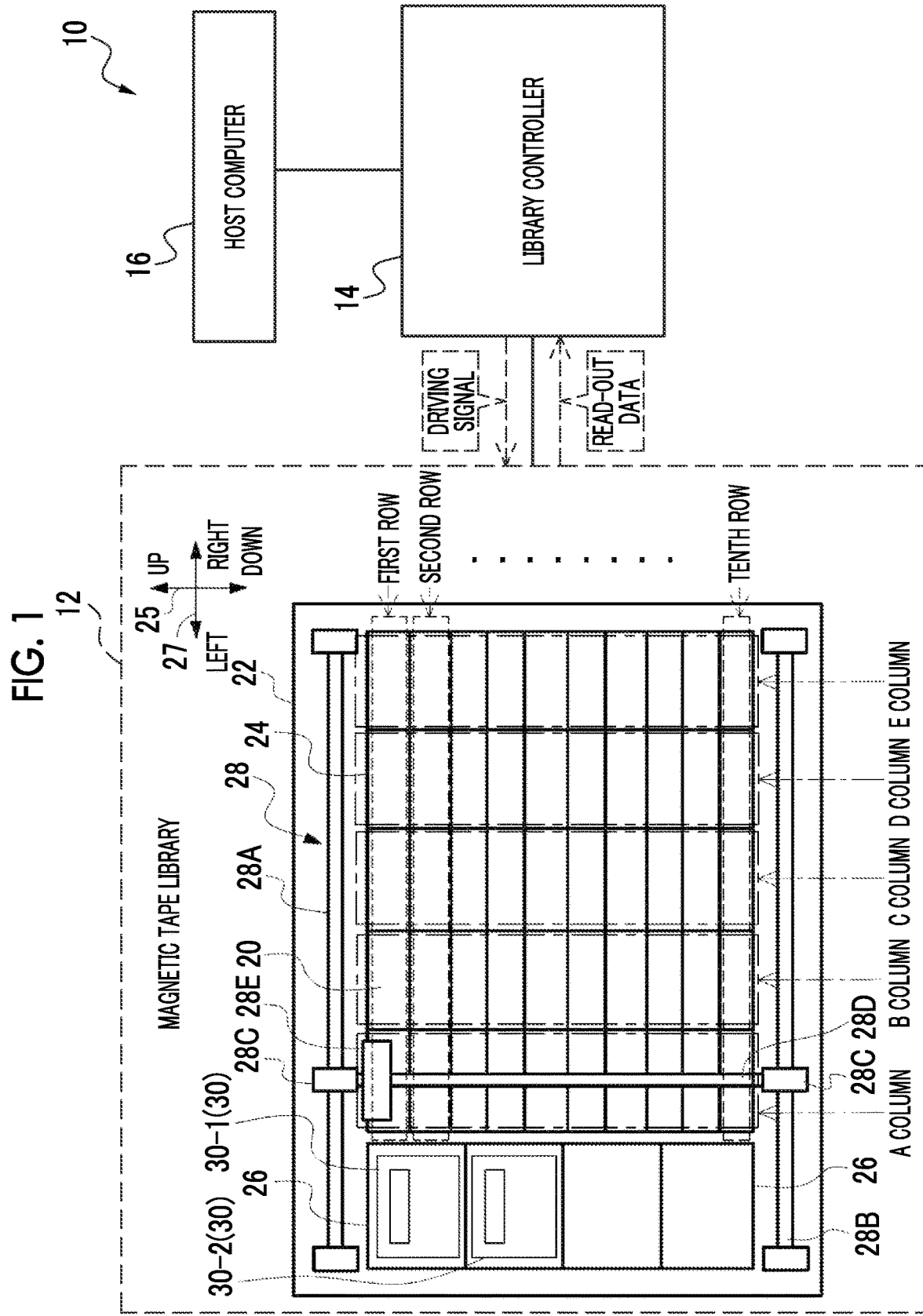
FIG. 1 is a schematic configuration diagram showing an example of the configuration of a cartridge management system according to an embodiment.

As shown in FIG. 1 as an example, a cartridge management system 10 comprises a magnetic tape library 12, a library controller 14, and a host computer 16.

The magnetic tape library 12 comprises a storage rack 22 that stores a plurality of magnetic tape cartridges 20 and one or more magnetic tape drives 30. The storage rack 22 is provided with a plurality of cartridge storage cells 24, a plurality of drive storage cells 26, and a transport mechanism 28. The magnetic tape cartridge 20 is an example of a "magnetic tape cartridge" according to the technique of the present disclosure.

Each cartridge storage cell 24 has, for example, a size capable of storing one magnetic tape cartridge 20, and a predetermined number of magnetic tape cartridges 20, for example, one magnetic tape cartridge is stored in each cartridge storage cell 24. The cartridge storage cells 24 are arranged in a lattice of, for example, 10 rows×5 columns. In the example shown in FIG. 1, although the cartridge storage cells 24 of 10 rows×5 columns are shown, this is merely an example, and it should suffice that the number of cartridge storage cells 24 is plural. Here, although a lattice-shaped arrangement is shown, this is merely an example, and other arrangement methods may be applied.

In FIG. 1, as indicated by a two-way arrow 25, a direction to the upside of the paper plane is referred to as an up direction, and a direction to the downside of the paper plane is referred to as a down direction. As indicated by a two-way arrow 27, a direction to the left of the paper plane is referred to as a left direction, and a direction to the right of the paper plane is referred to as a right direction.

In the example shown in FIG. 1, each row of the cartridge storage cell 24 is given a row number of 1 to 10 in order from the top in FIG. 1, and each column of the cartridge storage cell 24 is given a column symbol of A to E in order from the left in FIG. 1. Each cartridge storage cell 24 is given a cell name for identifying a position of the cartridge storage cell 24 using the row number and the column symbol. For example, the cartridge storage cell 24 positioned in the A column and the first row is given a cell name "A1".

One magnetic tape drive 30 is stored in each drive storage cell 26. In the example shown in FIG. 1, a first magnetic tape drive 30-1 is stored in the uppermost drive storage cell 26 among four drive storage cells 26 arranged in a vertical direction, and a second magnetic tape drive 30-2 is stored in a second uppermost drive storage cell 26. In the example shown in FIG. 1, although the number of drive storage cells 26 is four, the technique of the present disclosure is not limited, and the number of drive storage cells 26 may be one or more. In the following description, the first magnetic tape drive 30-1 and the second magnetic tape drive 30-2 are simply represented as a "magnetic tape drive 30" in a case where there is no need for distinction therebetween.

The magnetic tape cartridge 20 is loaded into the magnetic tape drive 30. The library controller 14 outputs a tape drive driving signal to the magnetic tape drive 30. The tape drive driving signal is a signal that instructs the magnetic tape drive 30 to drive. The magnetic tape drive 30 performs reading of data from the magnetic tape MT accommodated in the magnetic tape cartridge 20 and writing of data to the magnetic tape MT in response to the tape drive driving signal.

The transport mechanism 28 transports the magnetic tape cartridge 20 between the cartridge storage cell 24 and the magnetic tape drive 30. In the example shown in FIG. 1, the transport mechanism 28 comprises an upper bar 28A, a lower bar 28B, a pair of horizontally movable robots 28C, a vertical bar 28D, and a vertically movable robot 28E. The upper bar 28A is fixed to an upper portion of the storage rack 22 to extend in a horizontal direction. The lower bar 28B is fixed to a lower portion of the storage rack 22 in parallel with the upper bar 28A.

A pair of horizontally movable robots 28C is attached to both ends of the vertical bar 28D. A pair of horizontally movable robots 28C is fitted to the upper bar 28A and the lower bar 28B. The horizontally movable robots 28C are self-propellable robots that can move along the horizontal direction, and move the vertical bar 28D in the horizontal direction along the upper bar 28A and the lower bar 28B while maintaining the orientation of the vertical bar 28D vertically with respect to the orientations of the upper bar 28A and the lower bar 28B. The vertically movable robot 28E is attached to the vertical bar 28D. The vertically movable robot 28E is a self-propellable robot that can move along a vertical direction. That is, the vertically movable robot 28E moves in the vertical direction along the vertical bar 28D. The vertically movable robot 28E is provided with a holding part (not shown) that holds the magnetic tape cartridge 20.

Although a form example where the transport mechanism 28 includes the horizontally movable robots 28C and the vertically movable robot 28E has been described, this is merely an example. The transport mechanism 28 may have a configuration in which the magnetic tape cartridge 20 can be transported in the magnetic tape library 12.

The transport mechanism 28 operates under the control of the library controller 14. The library controller 14 outputs a transport mechanism driving signal to the transport mechanism 28. The transport mechanism driving signal is a signal that instructs the transport mechanism 28 to drive. A motor (not shown) is mounted in each of the horizontally movable robots 28C and the vertically movable robot 28E, and the motor of each of the horizontally movable robots 28C and the vertically movable robot 28E is driven in response to the transport mechanism driving signal input from the library controller 14 to generate power. The horizontally movable robots 28C and the vertically movable robot 28E are self-propelled using power generated by a motor.

The library controller 14 is connected to the magnetic tape library 12 to be communicable via a communication cable. The library controller 14 integrally controls the transport mechanism 28 and the magnetic tape drive 30. For example, the library controller 14 controls taking-out of the magnetic tape cartridge 20 from the cartridge storage cell 24 and storage of the magnetic tape cartridge 20 in the cartridge storage cell 24. The library controller 14 controls transport of the magnetic tape cartridge 20. The library controller 14 controls loading of the magnetic tape cartridge 20 into the magnetic tape drive 30 and taking-out of the magnetic tape cartridge 20 from the magnetic tape drive 30. The library controller 14 controls reading of data from the magnetic tape MT, writing of data to the magnetic tape MT, and the like.

The host computer 16 is connected to the library controller 14 to be communicable via a communication cable. Here, although wired communication has been illustrated, the technique of the present disclosure is not limited thereto, and wireless communication may be applied. The host computer 16 receives an instruction from a user and instructs reading of data from the magnetic tape MT accommodated in the magnetic tape cartridge 20 and writing of data to the magnetic tape MT.

The library controller 14 searches for a specific magnetic tape cartridge 20 (for example, a magnetic tape cartridge 20 to be a target for reading and writing of data) from a plurality of magnetic tape cartridges 20, makes the transport mechanism 28 take out the specific magnetic tape cartridge 20 from the cartridge storage cell 24, or makes the magnetic tape drive 30 read and write data from and to the magnetic tape MT in the specific magnetic tape cartridge 20, under the control of the host computer 16.

Next, an example of the configuration of the magnetic tape cartridge 20 will be described referring to FIGS. 2 and 3. In the following description, for convenience of description, a loading direction of the magnetic tape cartridge 20 into the magnetic tape drive 30 is indicated by an arrow A, an arrow A direction is referred to as a front direction of the magnetic tape cartridge 20, and a side in the front direction of the magnetic tape cartridge 20 is referred to as a front side of the magnetic tape cartridge 20. In the following description of the structure, "front" indicates the front side of the magnetic tape cartridge 20.

In the following description, for convenience of description, a direction opposite to the front direction of the magnetic tape cartridge 20 is referred to as a rear direction of the magnetic tape cartridge 20, and a side in the rear direction of the magnetic tape cartridge 20 is referred to as a rear side of the magnetic tape cartridge 20. In the following description of the structure, "rear" indicates the rear side of the magnetic tape cartridge 20.

In the following description, for convenience of description, an arrow B direction perpendicular to the arrow A direction is referred to as a right direction, and a side in the right direction of the magnetic tape cartridge 20 is referred to as a right side of the magnetic tape cartridge 20. In the following description of the structure, "right" indicates the right side of the magnetic tape cartridge 20.

In the following description, for convenience of description, a direction perpendicular to the arrow A direction and the arrow B direction is indicated by an arrow C, an arrow C direction is referred to as an up direction of the magnetic tape cartridge 20, and a side in the up direction of the magnetic tape cartridge 20 is referred to as an upside of the magnetic tape cartridge 20. In the following description of the structure, "up" indicates the upside of the magnetic tape cartridge 20.

In the following description, for convenience of description, a direction opposite to the up direction of the magnetic tape cartridge 20 is referred to as a down direction of the magnetic tape cartridge 20, and a side in the down direction of the magnetic tape cartridge 20 is referred to as a downside of the magnetic tape cartridge 20. In the following description of the structure, "down" indicates the downside of the magnetic tape cartridge 20.

Figure 2:
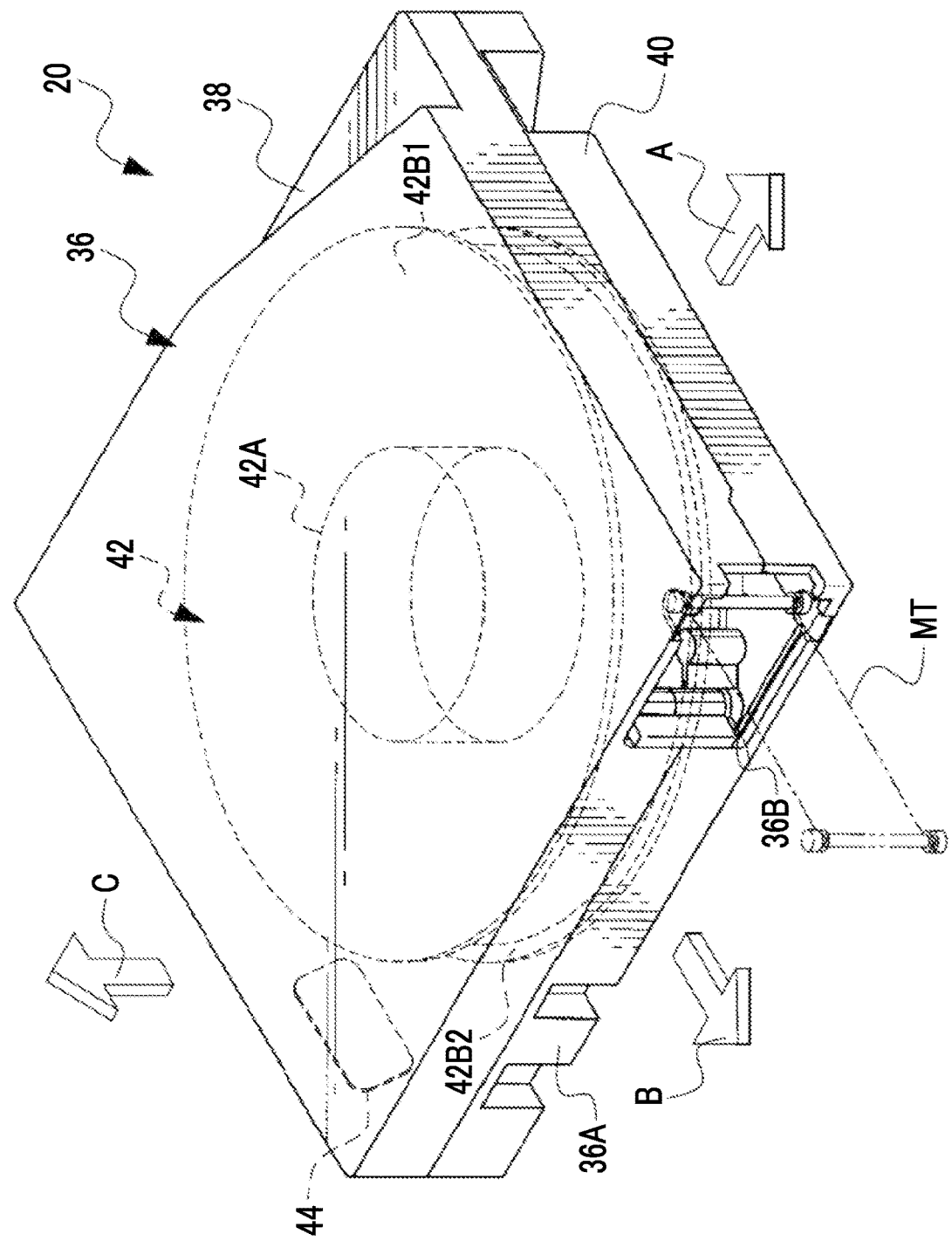
FIG. 2 is a schematic perspective view showing an example of the appearance of a magnetic tape cartridge according to the embodiment.

As shown in FIG. 2 as an example, the magnetic tape cartridge 20 has a substantially rectangular shape in plan view, and comprises a box-shaped case 36. The magnetic tape MT is accommodated in the case 36. The case 36 is formed of resin, such as polycarbonate, and comprises an upper case 38 and a lower case 40. The upper case 38 and the lower case 40 are bonded by welding (for example, ultrasonic welding) and screwing in a state in which a lower peripheral edge surface of the upper case 38 and an upper peripheral edge surface of the lower case 40 are brought into contact with each other. A bonding method is not limited to welding and screwing, and other bonding methods may be used. The case 36 is an example of a "case" according to the technique of the present disclosure.

Inside the case 36, a sending reel 42 is rotatably accommodated. The sending reel 42 comprises a reel hub 42A, an upper flange 42B1, and a lower flange 42B2. The reel hub 42A is formed in a cylindrical shape. The reel hub 42A is a shaft center portion of the sending reel 42, has a shaft center direction along an up-down direction of the case 36, and is disposed in a center portion of the case 36. Each of the upper flange 42B1 and the lower flange 42B2 is formed in an annular shape. A center portion in plan view of the upper flange 42B1 is fixed to an upper end portion of the reel hub 42A, and a center portion in plan view of the lower flange 42B2 is fixed to a lower end portion of the reel hub 42A. The reel hub 42A and the lower flange 42B2 may be integrally molded.

The magnetic tape MT is wound around an outer peripheral surface of the reel hub 42A, and an end portion in a width direction of the magnetic tape MT is held by the upper flange 42B1 and the lower flange 42B2.

An opening 36B is formed on a front side of a right wall 36A of the case 36. The magnetic tape MT is pulled out from the opening 36B.

A cartridge memory 44 is provided in the lower case 40. Specifically, the cartridge memory 44 is accommodated in a right rear end portion of the lower case 40. An IC chip (not shown) having an NVM is mounted on the cartridge memory 44. In the present embodiment, a so-called passive type RFID tag is employed as the cartridge memory 44, and reading and writing of various kinds of information are performed with respect to the cartridge memory 44 in a noncontact manner.

In the cartridge memory 44, management information for managing the magnetic tape cartridge 20 is stored. The management information includes, for example, information regarding the cartridge memory 44 (for example, information capable of specifying the magnetic tape cartridge 20), information regarding the magnetic tape MT (for example, information indicating the recording capacity of the magnetic tape MT, information indicating the outline of data recorded on the magnetic tape MT, information indicating items of data recorded on the magnetic tape MT, or information indicating a recording format of data recorded on the magnetic tape MT), and information regarding the magnetic tape drive 30 (for example, information indicating the specification of the magnetic tape drive 30 and signals that are used in the magnetic tape drive 30).

Figure 3:
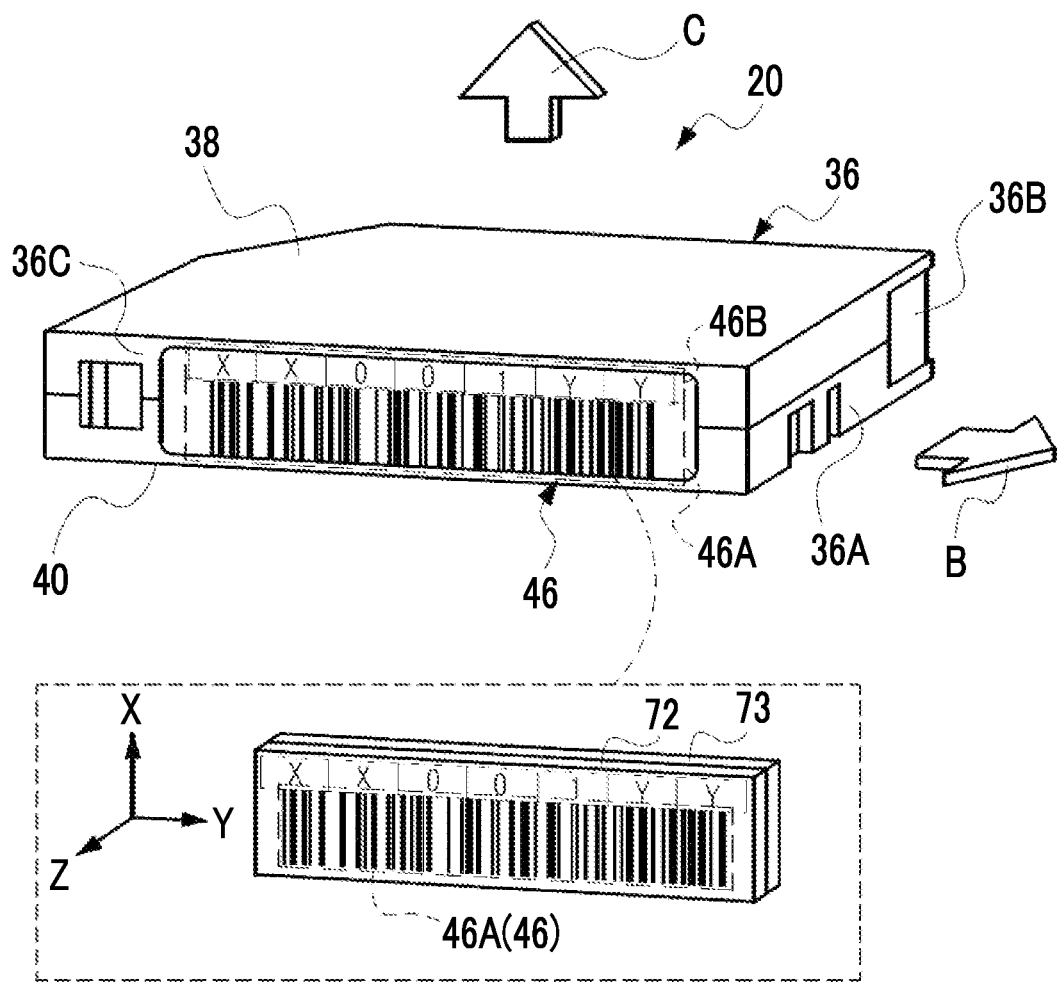
FIG. 3 is a schematic perspective view showing an example of an identifier displayed on the magnetic tape cartridge according to the embodiment.

As shown in FIG. 3 as an example, an identifier 46 is displayed on a surface of the case 36 of the magnetic tape cartridge 20. In the example shown in FIG. 3, the identifier 46 is displayed on a surface of a rear wall 36C of the case 36. The identifier 46 includes a barcode 46A. The barcode 46A is a one-dimensional image indicating information (for example, a serial number for managing the magnetic tape cartridge 20 given by the user) for identifying the magnetic tape cartridge 20. The magnetic tape cartridge 20 is stored in the cartridge storage cell 24 in a state in which the identifier 46 can be read. The identifier 46 is an example of an "identifier" according to the technique of the present disclosure, and the barcode 46A is an example of a "one-dimensional image" according to the technique of the present disclosure.

In the example shown in FIG. 3, the identifier 46 includes a character string 46B. The character string 46B is a character string (for example, a character string including a combination of alphanumeric characters) indicating information for identifying the magnetic tape cartridge 20. The character string 46B is displayed, whereby the user can visually identify the magnetic tape cartridge 20.

The identifier 46 is displayed on the case 36, for example, in such a manner that a label 72 on which the barcode 46A and the character string 46B are printed is peeled off from a mount 73, and the label 72 is attached to the front surface of the case 36. Here, although an example where the character string 46B is also printed on the label 72 has been shown, the barcode 46A may be printed and the description of the character string 46B may be blank and handwritten later. The label 72 is an example of a "label" according to the technique of the present disclosure.

Figure 4:
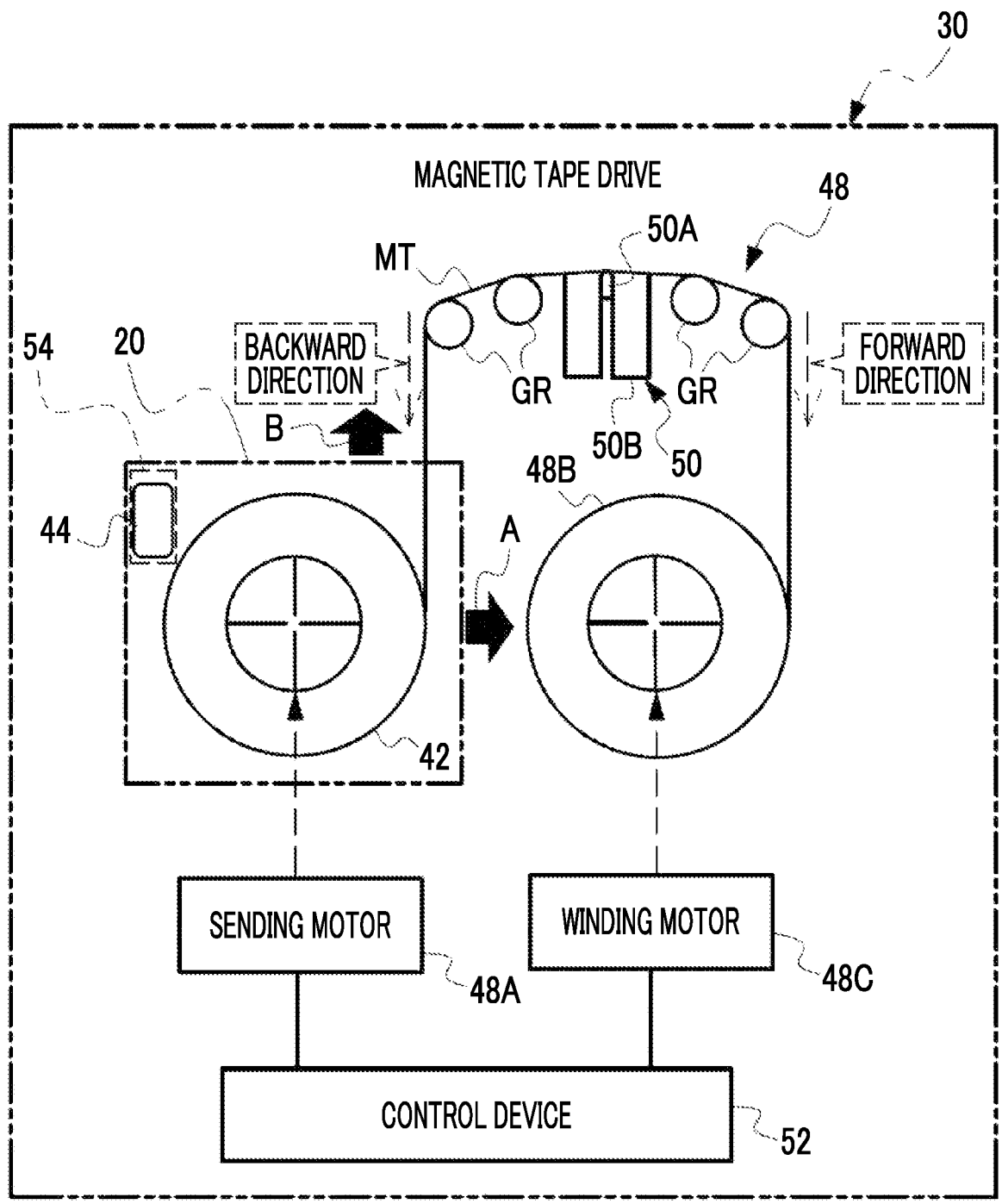
FIG. 4 is a schematic configuration diagram showing an example of the hardware configuration of a magnetic tape drive according to the embodiment.

As shown in FIG. 4 as an example, the magnetic tape drive 30 comprises a tape transport device 48, a magnetic head 50, and a control device 52. The magnetic tape cartridge 20 is loaded into the magnetic tape drive 30 along the arrow A direction. In the magnetic tape drive 30, the magnetic tape MT is pulled out from the magnetic tape cartridge 20 for use.

The magnetic tape drive 30 executes magnetic processing on the surface of the magnetic tape MT using the magnetic head 50. Here, the magnetic processing indicates recording of data on the surface of the magnetic tape MT and reading of data (that is, reproduction of data) from the surface of the magnetic tape MT. In the present embodiment, the magnetic tape drive 30 selectively performs recording of data on the surface of the magnetic tape MT and reading of data from the surface of the magnetic tape MT using the magnetic head 50. That is, the magnetic tape drive 30 pulls out the magnetic tape MT from the magnetic tape cartridge 20 and records data on the surface of the pulled-out magnetic tape MT using the magnetic head 50 or reads data from the surface of the pulled-out magnetic tape MT using the magnetic head 50.

The control device 52 controls the entire magnetic tape drive 30. In the present embodiment, although the control device 52 is realized by an ASIC, the technique of the present disclosure is not limited thereto. For example, the control device 52 may be realized by an FPGA and/or a PLC. Alternatively, the control device 52 may be realized by a computer including a CPU, a flash memory (for example, an EEPROM and/or an SSD), and a RAM. In addition, the control device 52 may be realized by combining two or more of an ASIC, an FPGA, a PLC, and a computer. That is, the control device 52 may be realized by a combination of a hardware configuration and a software configuration.

The tape transport device 48 is a device that selectively transports the magnetic tape MT in a forward direction and a backward direction along a predetermined path, and comprises a sending motor 48A, a winding reel 48B, a winding motor 48C, and a plurality of guide rollers GR. Here, the forward direction indicates a feeding direction of the magnetic tape MT, and the backward direction indicates a rewinding direction of the magnetic tape MT.

The sending motor 48A rotates the sending reel 42 in the magnetic tape cartridge 20 under the control of the control device 52. The control device 52 controls the sending motor 48A to control a rotation direction, a rotation speed, rotation torque, and the like of the sending reel 42.

The winding motor 48C rotates the winding reel 48B under the control of the control device 52. The control device 52 controls the winding motor 48C to control a rotation direction, a rotation speed, rotation torque, and the like of the winding reel 48B.

In a case where the magnetic tape MT is wound around the winding reel 48B, the control device 52 rotates the sending motor 48A and the winding motor 48C such that the magnetic tape MT runs along the predetermined path in the forward direction. The rotation speeds, the rotation torque, and the like of the sending motor 48A and the winding motor 48C are adjusted depending on a speed at which the magnetic tape MT is wound around the winding reel 48B. The rotation speed, the rotation torque, and the like of each of the sending motor 48A and the winding motor 48C are adjusted by the control device 52, whereby tension is given to the magnetic tape MT. The rotation speed, the rotation torque, and the like of each of the sending motor 48A and the winding motor 48C are adjusted by the control device 52, so that the tension that is given to the magnetic tape MT is controlled.

In a case where the magnetic tape MT is rewound around the sending reel 42, the control device 52 rotates the sending motor 48A and the winding motor 48C such that the magnetic tape MT runs along the predetermined path in the backward direction.

In the present embodiment, although the tension that is applied to the magnetic tape MT is controlled by controlling the rotation speeds, the rotation torque, and the like of the sending motor 48A and the winding motor 48C, the technique of the present disclosure is not limited thereto. For example, the tension applied to the magnetic tape MT may be controlled using a dancer roller or may be controlled by drawing the magnetic tape MT to a vacuum chamber.

Each of a plurality of guide rollers GR is a roller that guides the magnetic tape MT. The predetermined path, that is, a running path of the magnetic tape MT is determined by separately disposing a plurality of guide rollers GR at positions straddling over the magnetic head 50 between the magnetic tape cartridge 20 and the winding reel 48B.

The magnetic head 50 comprises a magnetic element unit 50A and a holder 50B. The magnetic element unit 50A is held by the holder 50B to be brought into contact with the running magnetic tape MT. The magnetic element unit 50A has a plurality of magnetic elements.

The magnetic element unit 50A records data on the magnetic tape MT that is transported by the tape transport device 48 or reads data from the magnetic tape MT that is transported by the tape transport device 48.

The magnetic tape drive 30 comprises the noncontact reading and writing device 54. The noncontact reading and writing device 54 is disposed to confront a back surface of the cartridge memory 44 on the downside of the magnetic tape cartridge 20 in a state in which the magnetic tape cartridge 20 is loaded, and performs reading and writing of information with respect to the cartridge memory 44 in a noncontact manner.

Figure 5:
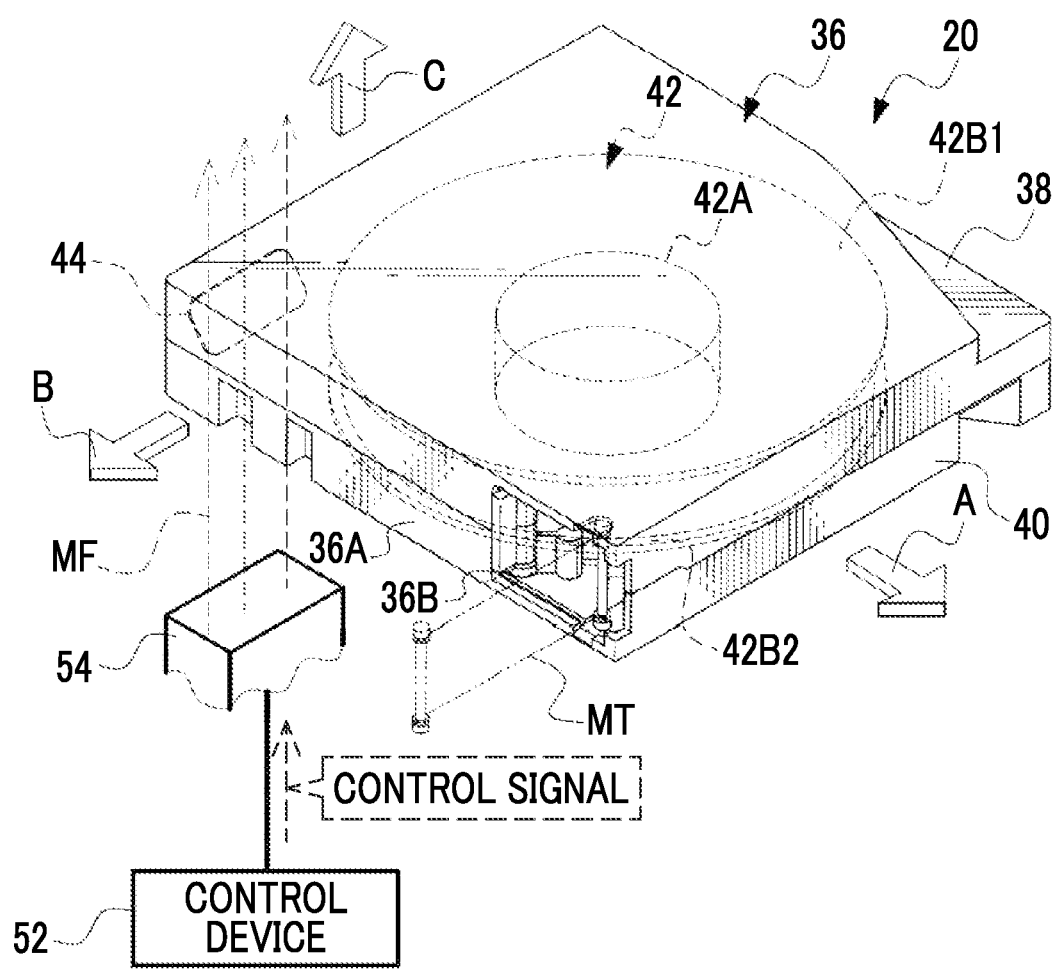
FIG. 5 is a schematic perspective view showing an example of an aspect in which a magnetic field is discharged from a lower side of the magnetic tape cartridge according to the embodiment by a noncontact reading and writing device.

As shown in FIG. 5 as an example, the noncontact reading and writing device 54 emits a magnetic field MF from below the magnetic tape cartridge 20 toward the cartridge memory 44. The magnetic field MF passes through the cartridge memory 44.

The noncontact reading and writing device 54 is connected to the control device 52. The control device 52 outputs a control signal to the noncontact reading and writing device 54. The control signal is a signal for controlling the cartridge memory 44. The noncontact reading and writing device 54 generates the magnetic field MF in response to the control signal input from the control device 52 and emits the generated magnetic field MF toward the cartridge memory 44.

The noncontact reading and writing device 54 performs noncontact communication with the cartridge memory 44 via the magnetic field MF to execute processing depending on the control signal on the cartridge memory 44. For example, the noncontact reading and writing device 54 selectively executes processing of reading information from the cartridge memory 44 and processing of storing information in the cartridge memory 44 (that is, processing of writing information to the cartridge memory 44) under the control of the control device 52.

Figure 6:
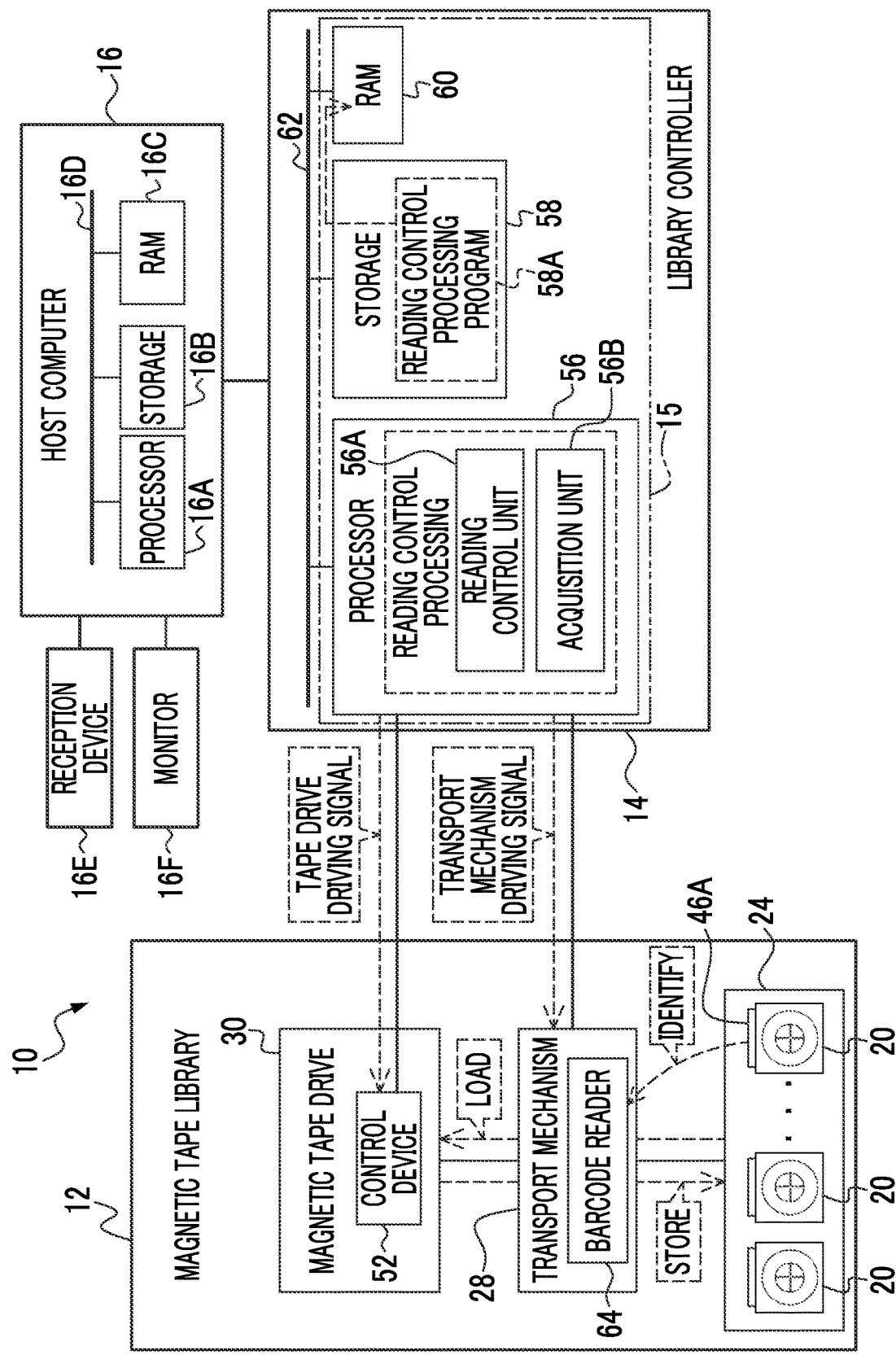
FIG. 6 is a schematic configuration diagram showing an example of the hardware configuration of the cartridge management system according to the embodiment.

As shown in FIG. 6 as an example, the library controller 14 comprises a computer 15. The computer 15 comprises a processor 56, a storage 58, and a RAM 60. The processor 56, the storage 58, and the RAM 60 are connected to a bus 62.

The processor 56 controls the entire library controller 14. The processor 56 has, for example, a CPU and a GPU, and controls the entire library controller 14. The GPU operates under the control of the CPU, and is responsible for executing screen display and/or image processing. The processor 56 may be one or more CPUs in which a GPU function is integrated or may be one or more CPUs in which a GPU function is not integrated.

The storage 58 is a non-volatile storage device that stores various programs, various parameters, and the like. An example of the storage 58 is a flash memory (for example, an EEPROM and/or an SSD). The flash memory is merely an example, and other non-volatile storage devices, such as an HDD, may be employed or a combination of two kinds or more of non-volatile storage devices may be employed. The RAM 60 is a volatile memory that is used as a work area or the like at the time of execution of various programs.

The processor 56 outputs a transport mechanism driving signal. The transport mechanism 28 selectively performs a loading operation and a storage operation in response to the transport mechanism driving signal input from the processor 56. The loading operation indicates an operation to take out the magnetic tape cartridge 20 from the cartridge storage cell 24 and to load the magnetic tape cartridge 20 into the magnetic tape drive 30 by moving the horizontally movable robots 28C (see FIG. 1) and the vertically movable robot 28E (see FIG. 1). The storage operation indicates an operation to take out the magnetic tape cartridge 20 from the magnetic tape drive 30 and to store the magnetic tape cartridge 20 in the original cartridge storage cell 24. In a case where the driving of the transport mechanism 28 based on the transport mechanism driving signal ends, the transport mechanism 28 returns a reference position (for example, the A1 cell) again.

The processor 56 outputs a tape drive driving signal. The control device 52 of the magnetic tape drive 30 selectively performs a readout operation to read out data from the magnetic tape MT (see FIG. 5) and a writing operation to write data to the magnetic tape MT in response to the tape drive driving signal input from the processor 56.

The host computer 16 gives an instruction depending on a user's request to the library controller 14. The host computer 16 comprises a processor 16A, a storage 16B, and a RAM 16C. The processor 16A controls the entire host computer 16. An example of the processor 16A is a CPU. The storage 16B is a non-volatile memory. Various programs are stored in the storage 16B. An example of the storage 16B is a flash memory (for example, an EEPROM and/or an SSD). The RAM 16C is a volatile memory that is used as a work area or the like at the time of execution of various programs.

The processor 16A, the storage 16B, and the RAM 16C are connected to a bus 16D. For example, a reception device 16E including, for example, a mouse, a keyboard, and a touch panel, and a monitor 16F, for example, an EL display or an LCD, is connected to the host computer 16. The reception device 16E receives an instruction from the user with respect to the host computer 16. The monitor 16F displays an output from the host computer 16 on a screen. Here, although the reception device 16E and the monitor 16F are illustrated as independent devices, the technique of the present disclosure is not limited thereto, and an input/output device in which the reception device 16E and the monitor 16F are integrated may be applied. An example of the input/output device is a touch panel display in which the touch panel included in the reception device 16E and the monitor 16F are integrated.

By the way, in a case where the transport mechanism 28 performs the loading operation, it is necessary to identify the magnetic tape cartridge 20 to be a target for the loading operation. The transport mechanism 28 comprises a barcode reader 64. As described above, the barcode 46A is displayed on the case 36 of the magnetic tape cartridge 20. The barcode 46A is read via the barcode reader 64, so that the magnetic tape cartridge 20 to be a target for the loading operation is identified. Therefore, reading control processing is executed by the processor 56. A reading control processing program 58A is stored in the storage 58. The processor 56 executes the reading control processing by reading out the reading control processing program 58A from the storage 58 and executing the read-out reading control processing program 58A on the RAM 60. The reading control processing is realized by the processor 56 operating as a reading control unit 56A and an acquisition unit 56B.

Figure 7:
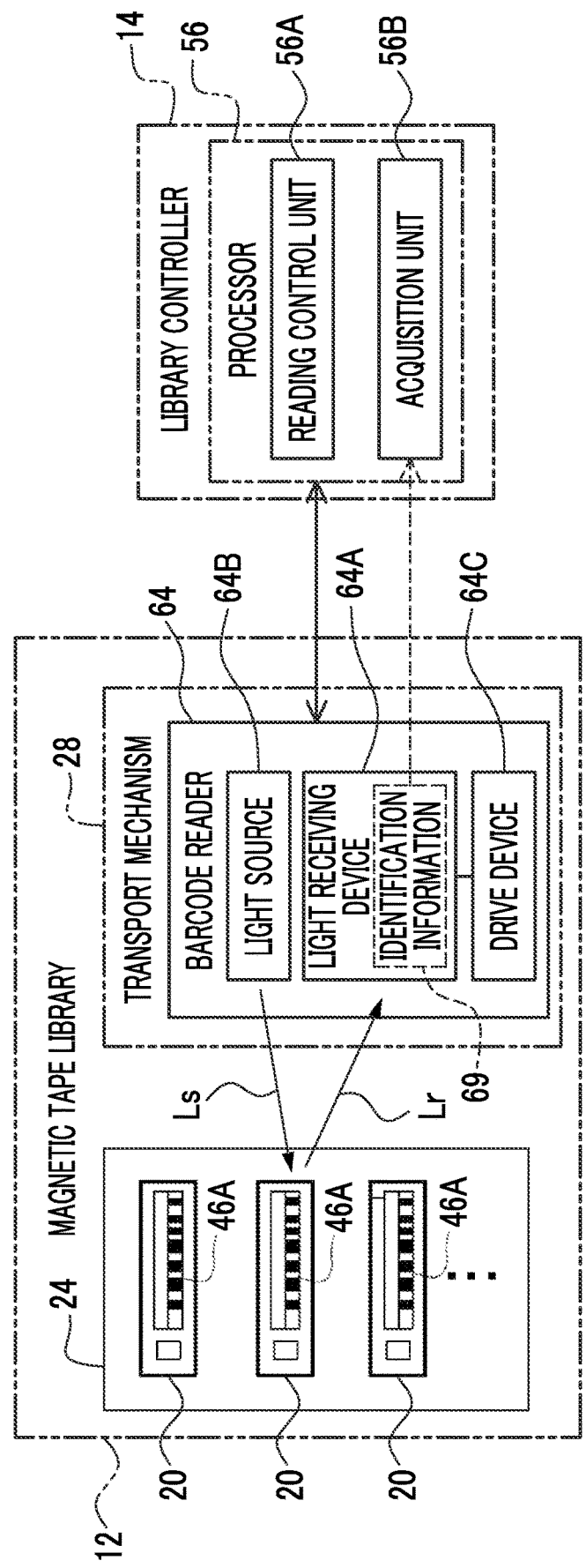
FIG. 7 is a conceptual diagram showing an example of a function of a library controller included in the cartridge management system according to the embodiment.

As shown in FIG. 7 as an example, the reading control unit 56A controls optical conditions (for example, a reading angle of a light receiving device 64A with respect to the barcode 46A, an output of a light source 64B, and/or an exposure time) in the barcode reader 64. In other words, the reading control unit 56A performs a reading setting in the barcode reader 64. The barcode reader 64 is a device that reads the barcode 46A. The barcode reader 64 comprises a light receiving device 64A and a light source 64B. For example, the light receiving device 64A is a CCD sensor. For example, the light source 64B is an LED light source that can irradiate the barcode 46A with light.

In a state in which the reading setting is made in the barcode reader 64, the barcode reader 64 reads the barcode 46A of the magnetic tape cartridge 20. Emitted light Ls emitted from the light source 64B is reflected by the barcode 46A. Part of the emitted light Ls is reflected by the barcode 46A, so that return light Lr is obtained. The return light Lr is detected in the light receiving device 64A. The barcode reader 64 generates identification information 69 that is information for identifying the barcode 46A, based on a detection result of the return light Lr. The identification information 69 is output from the barcode reader 64 to the processor 56 of the library controller 14. The acquisition unit 56B of the processor 56 acquires identification information 69. With this, the magnetic tape cartridge 20 in the magnetic tape library 12 is identified.

Figure 8:
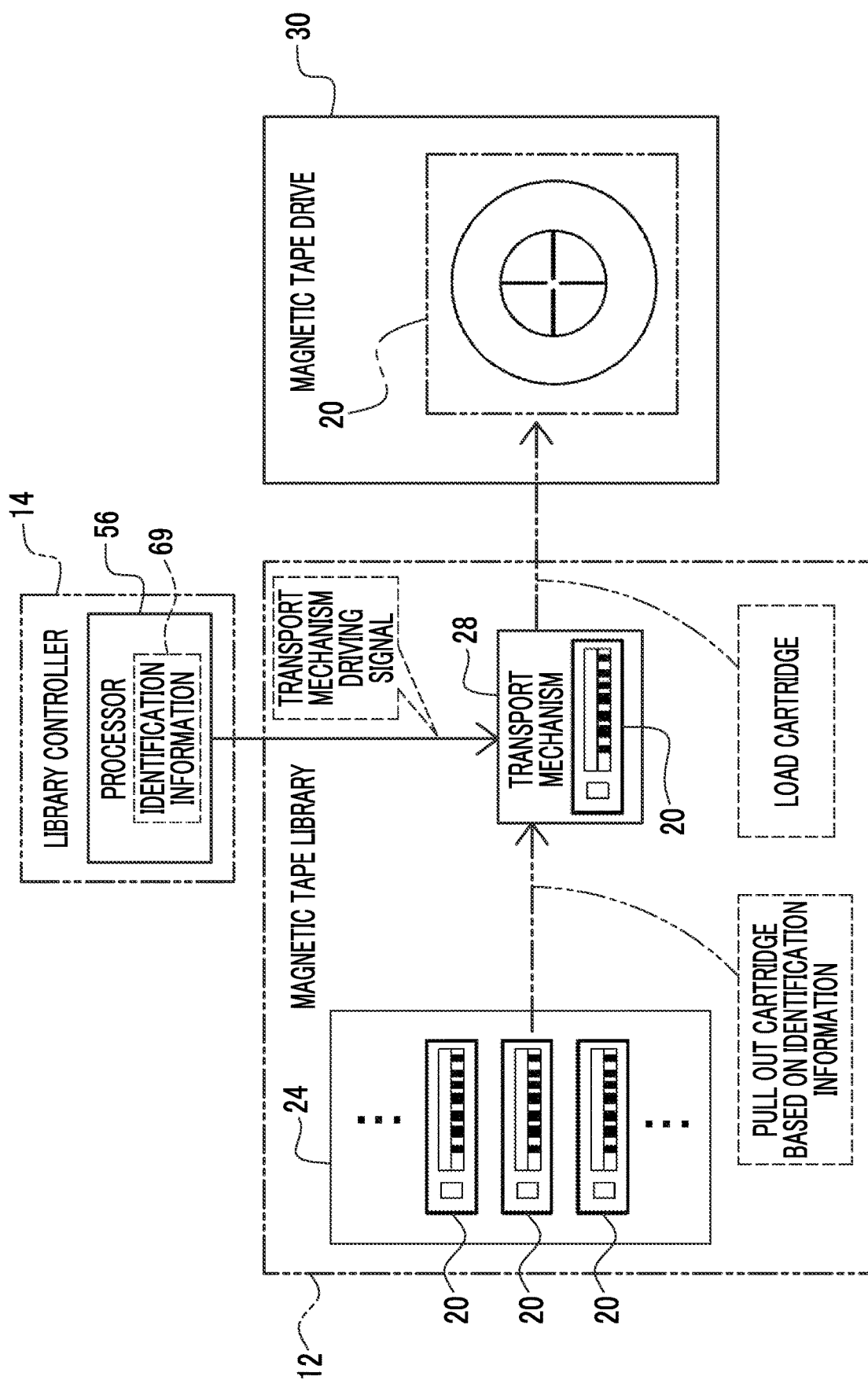
FIG. 8 is a conceptual diagram showing an example of a function of the library controller included in the cartridge management system according to the embodiment.

As shown in FIG. 8 as an example, the processor 56 determines whether or not the magnetic tape cartridge 20 specified by the content shown in the identification information 69 is the magnetic tape cartridge 20 as a target for the loading operation. In a case where the magnetic tape cartridge 20 specified by the content shown in the identification information 69 is the magnetic tape cartridge 20 as a target for the loading operation, the processor 56 outputs the transport mechanism driving signal to the transport mechanism 28. The transport mechanism 28 performs the loading operation in response to the transport mechanism driving signal. That is, the transport mechanism 28 pulls out the magnetic tape cartridge 20 specified by the identification information 69 and transports the magnetic tape cartridge 20 to the magnetic tape drive 30. In addition, the transport mechanism 28 loads the magnetic tape cartridge 20 into the magnetic tape drive 30. The magnetic tape drive 30 selectively performs recording of data on the surface of the magnetic tape MT (see FIG. 4) and reading of data from the surface of the magnetic tape MT with respect to the loaded magnetic tape cartridge 20.

Note that, in a case (see FIG. 7) where the barcode 46A is read in the magnetic tape library 12, the barcode 46A may not be correctly read depending on a surface shape (for example, surface roughness) of the label 72 on which the barcode 46A is printed. For example, in a case where the smoothness of the front surface of the label 72 on which the barcode 46A is printed is high, light regularly reflected by the label front surface may be incident on the barcode reader 64, and halation may occur. In a case where halation occurs, the barcode 46A of the portion where halation occurs cannot be read, resulting in reading failure.

Figure 9:
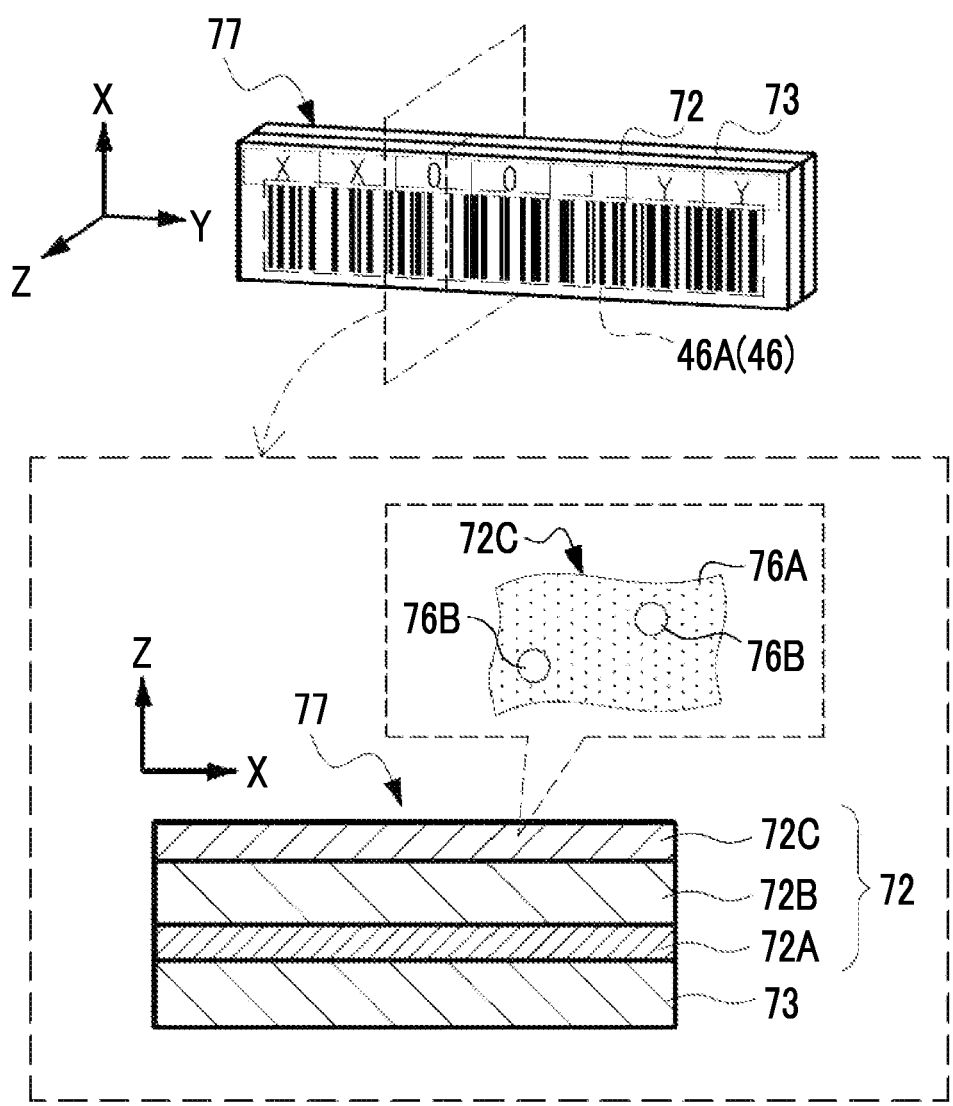
FIG. 9 is a schematic perspective view showing a configuration example of a label of the magnetic tape cartridge according to the embodiment.

Therefore, in view of such a situation, in the present embodiment, a surface state of the label 72 provided on the magnetic tape cartridge 20 is controlled. As shown in FIG. 9 as an example, the label 72 has a pressure-sensitive adhesive layer 72A, a substrate 72B, and a coat layer 72C. As described above, in a state before being attached to the magnetic tape cartridge 20, the label 72 is attached to the mount 73 via the pressure-sensitive adhesive layer 72A. In this way, a member in a state in which the label 72 and the mount 73 are integrated is called a label paper 77. The substrate 72B is an example of a "substrate" according to the technique of the present disclosure, and the coat layer 72C is an example of a "coat layer" according to the technique of the present disclosure.

A material of the mount 73 is not particularly limited as long as the label 72 that is attached once can be peeled again, and an example of the material is a glassine paper or a polyester film.

The label 72 has the pressure-sensitive adhesive layer 72A, the substrate 72B, and the coat layer 72C in order from the mount 73 in a thickness direction (the Z direction shown in FIG. 9). The pressure-sensitive adhesive layer 72A is a layer having pressure-sensitive adhesiveness, and a material thereof is not particularly limited as long as the mount 73 or the front surface of the magnetic tape cartridge 20 and the label 72 can be bonded. For example, the pressure-sensitive adhesive layer 72A includes any of an emulsion-based pressure-sensitive adhesive, an acrylic pressure-sensitive adhesive, a rubber-based pressure-sensitive adhesive, or a silicon-based pressure-sensitive adhesive.

The substrate 72B is a member that is a base for defining the size or strength of the label 72. A material of the substrate 72B is not particularly limited, and an example of the material is a polyethylene terephthalate (PET) paper of a polyester-based biaxially oriented film.

The coat layer 72C is a layer formed on the front surface of the substrate 72B, and the surface shape is controlled, so that light (for example, return light Lr) reflected by the label 72 is scattered. The coat layer 72C includes a binder 74 and an additive 76 dispersed in the binder 74. The binder 74 is, for example, urethane resin, and the additive 76 is particles that are dispersible in the binder 74 and are, for example, particles of inorganic oxide. The additive 76 is, for example, $SiO_2$ (silica) particles 76A. An average particle diameter of the particles that are added as the additive 76 is, for example, 10 μm. On the coat layer 72C, the identifier 46 (here, the barcode 46A) is printed.

The surface shape of the coat layer 72C is controlled, so that light reflected by the label 72 is scattered. That is, the glossiness of the label 72 is reduced. Here, the glossiness is an index of gloss obtained by digitizing an intensity ratio of incident light and regularly reflected light in a case where a certain object is irradiated with light.

Here, in reading the barcode 46A, it is necessary to distinguish and recognize portions of black bars and portions of white bars of the barcode 46A. For this reason, in a waveform 78 (see FIG. 10; hereinafter, simply called a "reading waveform 78") indicating a reading result of the barcode 46A, portions (that is, portions with low reflectance R) corresponding to the black bars of the barcode 46A and portions (that is, portions with high reflectance R) corresponding to the white bars of the barcode 46A are distinguished using a threshold value. As an example of the threshold value, a median value Rav of an average value of the portions with high reflectance R and an average value of the portions with low reflectance R is used. With this, in the reading waveform 78 of the barcode 46A, portions that show reflectance greater than the median value Rav are determined to be the portions corresponding to the white bars of the barcode 46A. Portions that show reflectance smaller than the median value Rav are determined to be the portions corresponding to the black bars of the barcode 46A.

Note that, as described above, the intensity of reflected light becomes high depending on the surface shape of the label 72, and consequently, it may be difficult to distinguish the portions of the black bars and the portions of the white bars of the barcode 46A. That is, the reflectance of a part of the label 72 becomes high, and consequently, even the portion of the black bar also shows high reflectance. As a result, even in the portions with low reflectance R, the reflectance may exceed the median value Rav. In this case, it is impossible to distinguish and recognize the portions of the black bars and the portions of the white bars of the barcode 46A using the median value Rav as the threshold value.

Figure 10:
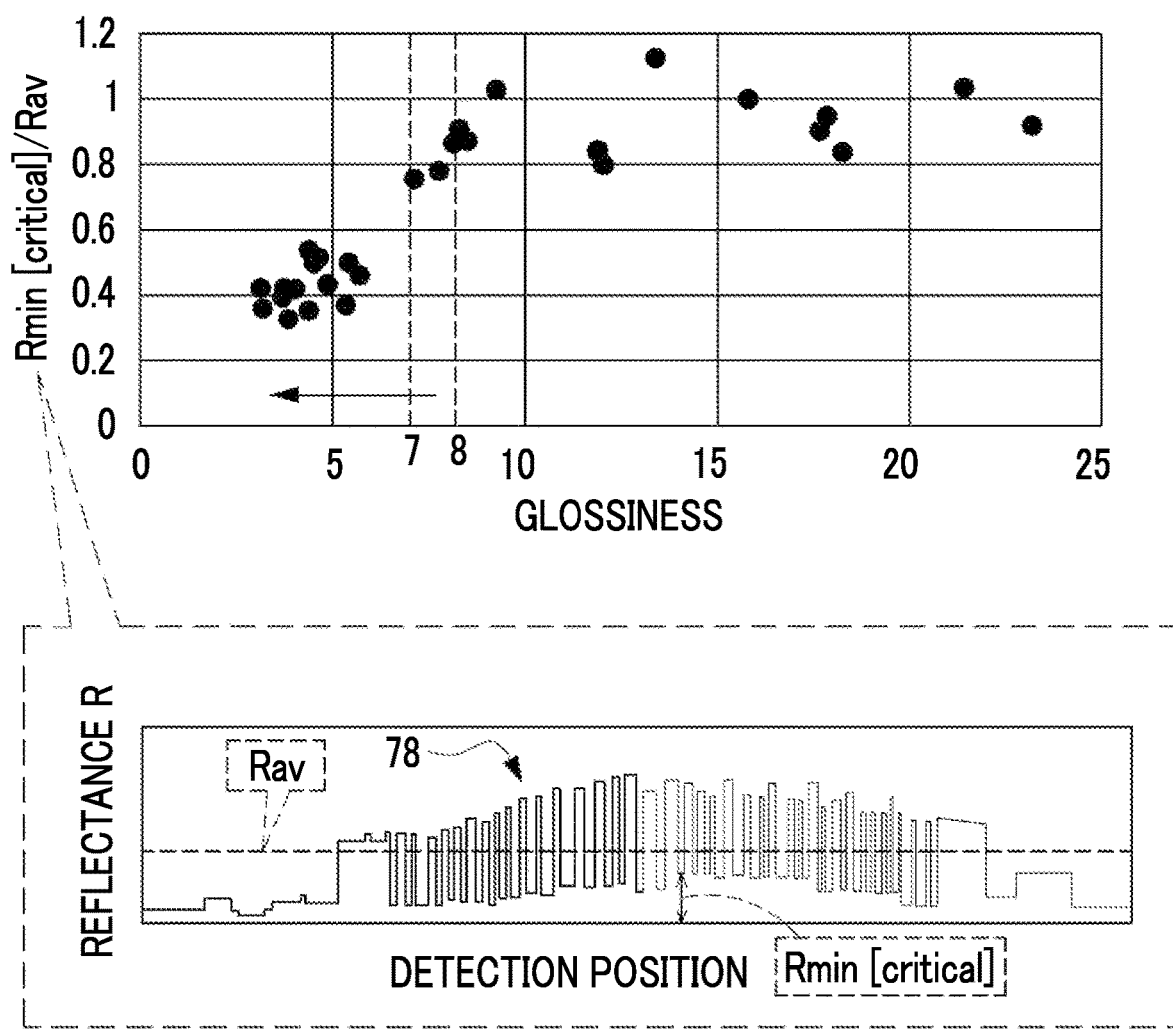
FIG. 10 is a diagram showing an example of a relationship between glossiness and reflectance of the label of the magnetic tape cartridge according to the embodiment.

FIG. 10 shows an example of a relationship between glossiness and Rmin[critical]/Rav. Here, Rmin[critical]/Rav is a ratio of a maximum value Rmin[critical] of reflectance of a portion with comparatively low reflectance R to the median value Rav. In a case where Rmin[critical]/Rav exceeds 1, this indicates that there is a portion where the reflectance of the portion with comparatively low reflectance R is greater than the median value Rav, and means that reading failure of the barcode 46A is highly likely to occur. Here, the glossiness is measured using a gloss meter NOVO GLOSS 60° (incident angle 60 degrees). A measurement region of glossiness is a range of 6 mm×12 mm. The reflectance is measured using a barcode verifier LVS-9505/LVS-9510 manufactured by INTEGRA.

As shown in FIG. 10 as an example, in a case where the surface shape of the label 72 is controlled, and the glossiness is changed in various ways (for example, a particle diameter of particles to be added is changed), in a region where the glossiness is greater than 8, Rmin[critical]/Rav is in a range of 1±0.2. Here, considering a measurement error in reading the barcode 46A, in a region where the glossiness is greater than 8, reading failure is highly likely to occur. On the other hand, in a region where the glossiness is equal to or smaller than 8, Rmin[critical]/Rav falls below 0.8, and reading failure is less likely to occur compared to a region where the glossiness is greater than 8. In particular, in a region where the glossiness is equal to or smaller than 7, Rmin[critical]/Rav falls below 0.6, and reading failure is much less likely to occur compared to the region where the glossiness is greater than 8. In this way, it is possible to evaluate the occurrence of reading failure of the barcode 46A with the glossiness of the label 72 as an index.

Figure 11:
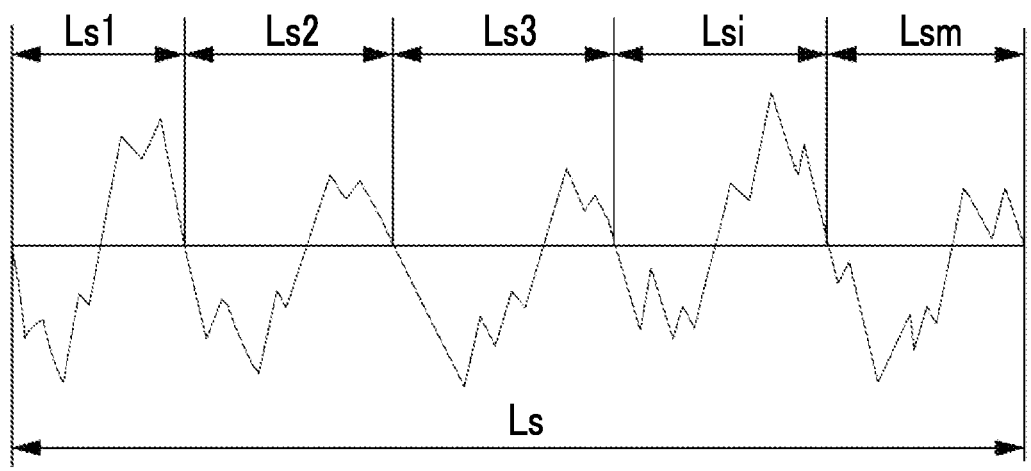
FIG. 11 is a conceptual diagram illustrating an average period of surface protrusions of the label of the magnetic tape cartridge according to the embodiment.

The surface shape of the coat layer 72C of the label 72 is controlled to make the glossiness equal to or smaller than a predetermined value, so that reading failure of the barcode 46A is suppressed. From this, the present inventors have conducted intensive studies and have conceived of controlling an average period Rsm (hereinafter, also simply called a "surface protrusion period Rsm") of surface protrusions of the coat layer 72C as the control of the surface shape. Here, as shown in FIG. 11 as an example, the average period Rsm of the surface protrusions represents an average of a length of a contour curve element in a reference length Ls, and is represented by Expression (1).

$$R_{sm} = \frac{1}{m}\sum_{i=1}^{N} L_{si} \quad (1)$$

Lsi indicates a length corresponding to one contour curve element. Peaks (troughs) composing a contour curve element in this case have restrictions of a lowest height and a shortest length, and the peaks (troughs) the heights (depths) of which are equal to or smaller than 10% of a greatest height or the lengths of which are equal to or smaller than 1% of a length of a calculation section are regarded as noise, and are recognized as parts of troughs (peaks) around the peaks (troughs). The surface protrusion period Rsm is obtained by performing analysis using three-dimensional surface roughness analysis software McubeMap v8.0 on a result measured using a roughness meter SV-3200H8/SV-C4500CNC manufactured by MITSUTOYO Corporation. Measurement conditions are a measurement range: 0.3 mm×0.3 mm, a measurement length: 0.3 mm, a measurement pitch: 0.5 μm, the number of surface protrusions to be measured: 601, and a measurement speed: 0.5 mm/s.

Figure 12:
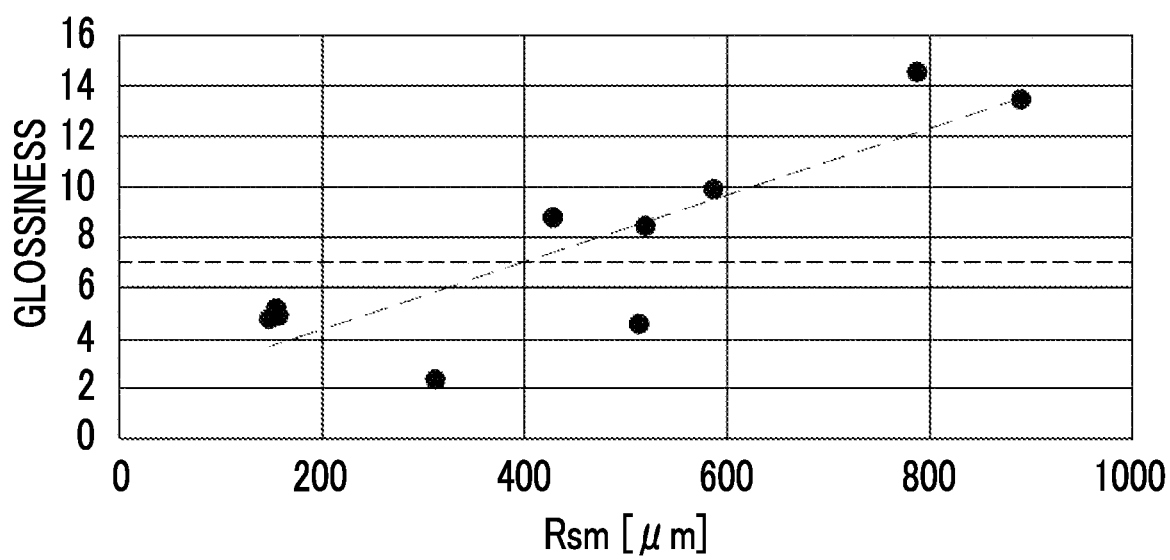
FIG. 12 is a diagram showing an example of a relationship between glossiness and the average period of the surface protrusions of the label of the magnetic tape cartridge according to the embodiment.

FIG. 12 shows an example of a relationship between the surface protrusion period Rsm and the glossiness. As shown in FIG. 12 as an example, in a case where the surface protrusion period Rsm decreases, the glossiness is also reduced. This is considered to indicate that the surface protrusion period Rsm decreases, so that the number of uneven portions of the front surface increases and scattering of reflected light easily occurs. Then, in a case where the surface protrusion period Rsm is equal to or smaller than 400, the glossiness falls below 7. Accordingly, the surface protrusion period Rsm is set to be equal to or smaller than 400 μm as the control of the surface shape of the coat layer 72C, so that the glossiness is equal to or smaller than 7. That is, reading failure of the barcode 46A is suppressed.

An example of setting the surface protrusion period Rsm to be equal to or smaller than 400 μm as the control of the surface shape of the coat layer 72C is changing the additive to be added to the coat layer 72C as described above. For example, SiO$_2$ particles are added as the additive, and an average particle diameter of the SiO$_2$ particles is set to 10 μm. With this, it is realized to set the surface protrusion period Rsm of the coat layer 72C to be equal to or smaller than 400 μm. The SiO$_2$ particles are present at a rate of 30/0.02 mm$^2$ on the paper surface of the label paper 77 in a state in which the coat layer 72C is formed on the substrate 72B.

A lower limit value of the surface protrusion period Rsm is suitably set according to the durability of the coat layer 72C and/or the reading characteristics of the barcode 46A. For example, the surface protrusion period Rsm is equal to or greater than 100 μm. A thickness of the coat layer 72C is also suitably set according to the durability of the coat layer 72C. A thickness of the label paper 77 in a state in which the coat layer 72C is formed is, for example, 35 to 50 μm.

As described above, in the cartridge management system 10 according to the present embodiment, the label 72 provided on the front surface of the case 36 is provided in the magnetic tape cartridge 20. The label 72 includes the coat layer 72C that is formed on the front surface of the substrate 72B attached to the case 36 and scatters light reflected by the label with the control of the surface shape and on which the identifier 46 for identifying the magnetic tape cartridge 20 is printed. Then, with the control of the surface shape, the coat layer 72C has the average period Rsm of the surface protrusions equal to or smaller than 400 μm. In this configuration, because light is scattered by controlling the surface shape in the coat layer 72C, regular reflection of light by the label 72 is suppressed. A reduction of regularly reflected light contributes to suppression of reading failure resulting from the occurrence of halation in reading the identifier 46. With this, in reading the identifier 46 printed on the label 72 of the magnetic tape cartridge 20 in the magnetic tape library 12, it is realized to suppress the occurrence of reading failure.

In this configuration, in the coat layer 72C, the average period Rsm of the surface protrusions is equal to or smaller than 400 μm, so that light reflected by the label 72 is easily scattered compared to a case where the average period Rsm of the surface protrusions is greater than 400 μm. In a case where the surface protrusion period Rsm is large, in printing the barcode 46A, a space between protrusions is filled with ink, so that smoothness increases and halation easily occurs. In this configuration, because the average periods Rsm of the surface protrusions is set to be equal to or smaller than 400 μm, in reading the identifier 46 printed on the label 72 of the magnetic tape cartridge 20, it is realized to suppress the occurrence of reading failure.

For example, reading of the label 72 of the magnetic tape cartridge 20 is often performed in the magnetic tape library 12. In this case, because the inside of the magnetic tape library 12 is dark compared to the outside, the label 72 may be irradiated with light from an auxiliary light (not shown) for reading. Here, a positional relationship between the label 72 and the barcode reader 64 is limited depending on a layout in the library. For example, a distance between the label 72 and the barcode reader 64 is short. As a result, regularly reflected light is easily incident on the barcode reader 64, and reading failure of the barcode 46A easily occurs. This configuration suppresses the occurrence of reading failure in such a case.

In the cartridge management system 10 according to the present embodiment, the glossiness of the coat layer 72C of the label 72 is equal to or smaller than 7 in the magnetic tape cartridge 20. With this, light reflected by the label 72 is easily scattered compared to a case where the glossiness is greater than 7. As a result, in reading the identifier 46 printed on the label 72 of the magnetic tape cartridge 20, it is realized to suppress the occurrence of reading failure.

In the cartridge management system 10 according to the present embodiment, the control of the surface shape of the coat layer 72C includes addition of particles having an average particle diameter equal to or greater than 10 μm in the magnetic tape cartridge 20. With this, for example, the control of the surface shape is easily performed compared to a case where the surface shape is controlled by performing after-treatment, such as roughening treatment, on the coat layer 72C.

In the cartridge management system 10 according to the present embodiment, the $SiO_2$ particles are added as the additive 76 to the coat layer 72C in the magnetic tape cartridge 20. Because the $SiO_2$ particles are generally particles made of a material that is chemically stable and comparatively inexpensive, the surface shape is easily controlled, and cost can also be reduced.

In the cartridge management system 10 according to the present embodiment, the identifier 46 that is displayed on the magnetic tape cartridge 20 includes the barcode 46A. Therefore, according to this configuration, the magnetic tape cartridge 20 is easily identified, compared to a case where the identifier 46 is composed only of the character string 46B.

Modification Example 1

In the above-described embodiment, although a form example where the surface protrusion period Rsm is controlled in the control of the surface shape of the coat layer 72C has been described, the technique of the present disclosure is not limited thereto. In the modification example 1, in the control of the surface shape of the coat layer 72C, control of a surface protrusion height is performed in addition to the control of the surface protrusion period Rsm.

Figure 13:
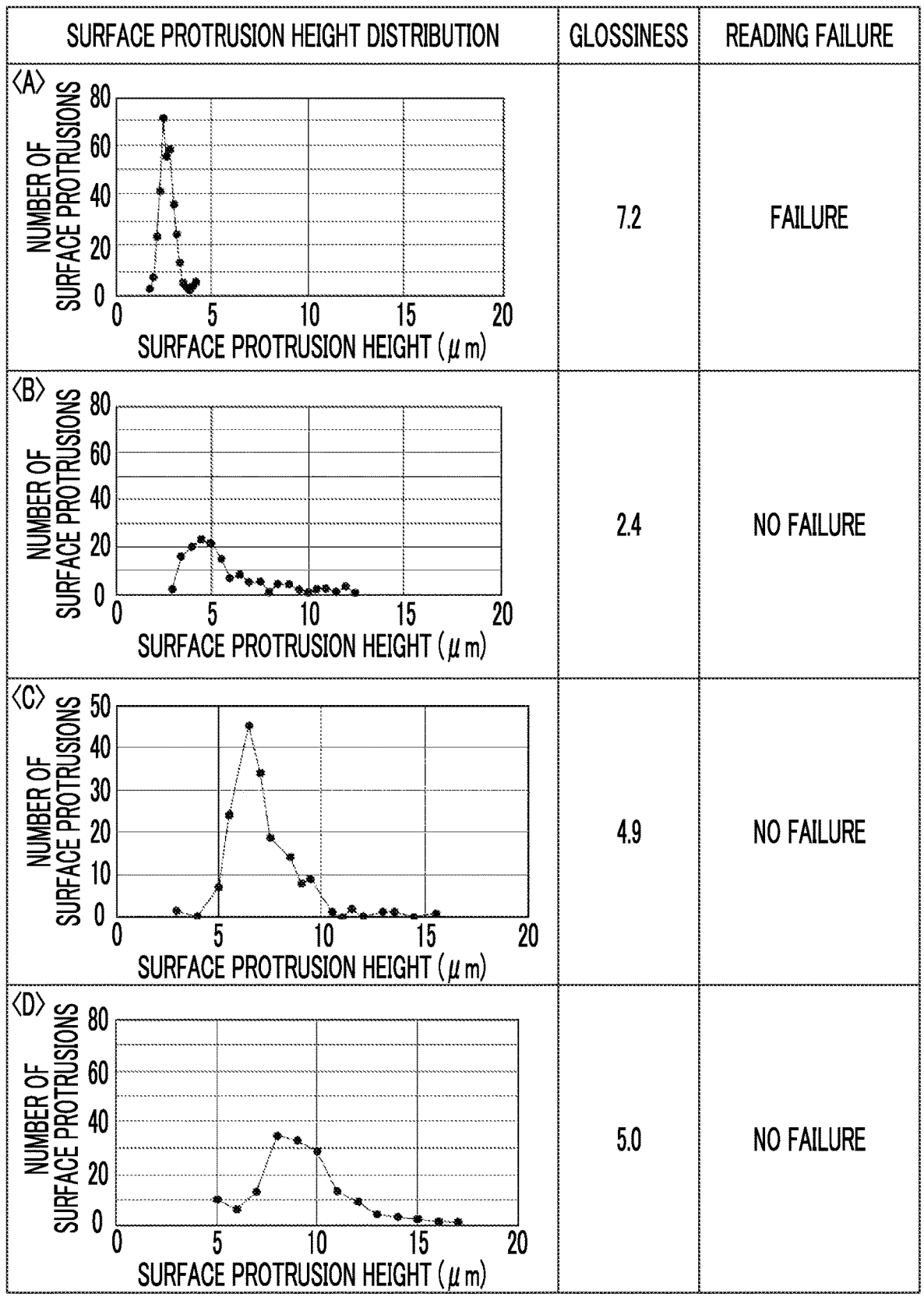
FIG. 13 is a diagram showing an example of a relationship of a distribution of surface protrusion heights, glossiness, and reading failure of the label of the magnetic tape cartridge according to the embodiment.

In the modification example 1, in the control of the surface shape of the coat layer 72C, control for providing a protrusion height equal to or greater than a predetermined value is performed in a distribution of surface protrusion heights. Specifically, the control of the surface protrusion height is performed by adding the $SiO_2$ particles (here, a particle diameter of 10 μm) as the additive of the coat layer 72C. FIG. 13 is a diagram showing an example of a relationship of the distribution (hereinafter, also simply called a "protrusion height distribution") of the surface protrusion heights, the glossiness, and reading failure. Here, the distribution of the surface protrusion heights is a histogram of protrusion heights in the front surface of the coat layer 72C. First, as shown in <A> of FIG. 13 as an example, in a case where the control of the surface protrusion height is not performed, the surface protrusion heights are distributed to be equal to or lower than 5 μm in the protrusion height distribution. Then, the glossiness in this case is 7.2, and reading failure of the barcode 46A occurs.

As shown in <B> of FIG. 13 as an example, in the coat layer 72C, the protrusion heights equal to or higher than 10 μm are present in the protrusion height distribution by performing the control of the surface protrusion height (for example, adding the $SiO_2$ particles (here, the particle diameter of 10 μm)). The glossiness in this case is 2.4, and reading failure of the barcode 46A does not occur.

As shown in <C> of FIG. 13 as an example, in the coat layer 72C, the protrusion heights equal to or higher than 10 μm are present in the protrusion height distribution by performing the control of the surface protrusion height. The glossiness in this case is 4.9, and reading failure of the barcode 46A does not occur.

As shown in <D> of FIG. 13 as an example, in the coat layer 72C, the protrusion heights equal to or higher than 10 μm are present in the protrusion height distribution by performing the control of the surface protrusion height. The glossiness in this case is 5.0, and reading failure of the barcode 46A does not occur.

In this way, in the control of the surface shape of the coat layer 72C, the control of the surface protrusion height is performed in addition to the control of the surface protrusion period Rsm, so that the protrusion heights equal to or higher than 10 μm are present in the protrusion height distribution. In a case where the protrusion heights equal to or higher than 10 μm are presented in the distribution of the surface protrusion heights, this means that comparatively large uneven portion is present in the front surface even partially. Because light reflected by the label 72 is scattered due to the presence of unevenness, glossiness is reduced. As a result, reading failure of the barcode 46A is suppressed. In the distribution of the surface protrusion heights, an upper limit of the surface protrusion height is, for example, 20 µm.

As described above, in the cartridge management system 10 according to the present modification example 1, the distribution of the surface protrusion heights is suppressed in the magnetic tape cartridge 20. In the surface protrusion height distribution of the coat layer 72C of the label 72, the surface protrusion heights equal to or greater than the predetermined value are provided. With this, light reflected by the label 72 is easily scattered compared to a case where the glossiness is greater than 7. As a result, in reading the identifier 46 printed on the label 72 of the magnetic tape cartridge 20, it is realized to suppress the occurrence of reading failure.

In the cartridge management system 10 according to the present modification example 1, in the magnetic tape cartridge 20, the coat layer 72C has the surface protrusion height equal to or higher than 10 µm in the surface protrusion height distribution. The coat layer 72C has the height equal to or higher than 10 µm in the surface protrusion height distribution, so that light reflected by the label 72 is easily scattered compared to a case where there is no surface protrusion having a height equal to or higher than 10 µm. With this, in reading the identifier 46 printed on the label 72 of the magnetic tape cartridge 20, it is realized to suppress the occurrence of reading failure.

Modification Example 2

In the above-described embodiment, although a form example where the barcode 46A is displayed as the identifier 46 has been described, the technique of the present disclosure is not limited thereto. In the modification example 2, a two-dimensional matrix image 46C is displayed as the identifier 46 instead of the barcode 46A.

Figure 14:
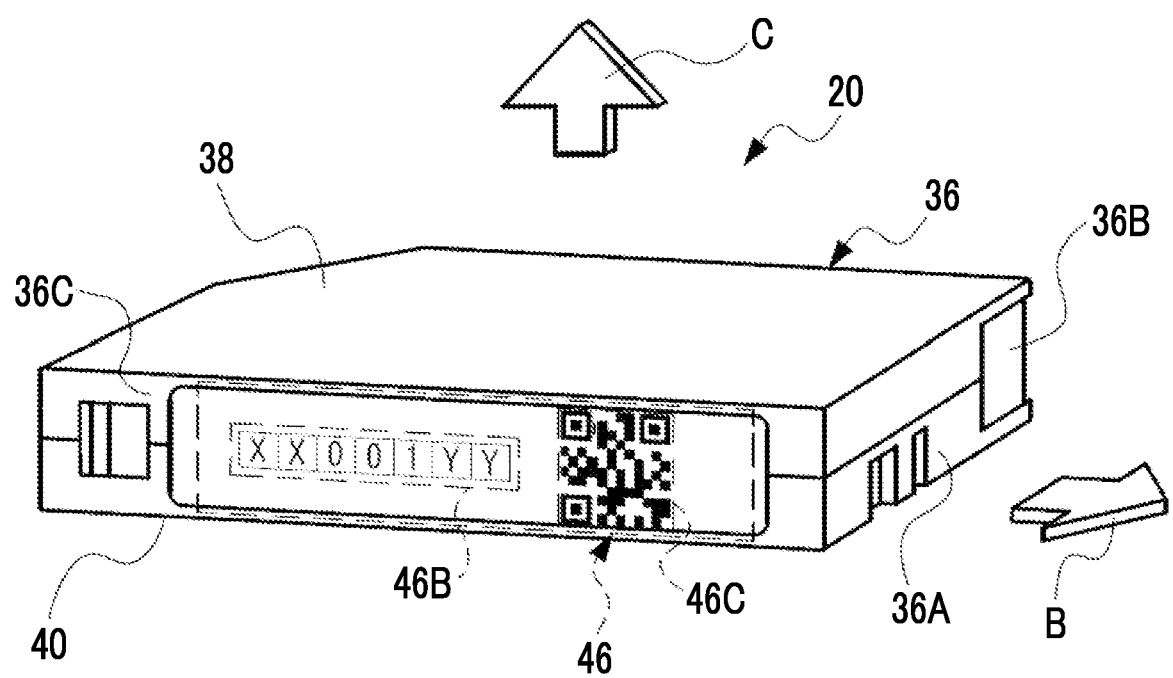
FIG. 14 is a schematic perspective view showing an example of an identifier displayed on the magnetic tape cartridge according to the embodiment.

As shown in FIG. 14 as an example, the identifier 46 is displayed on the surface of the case 36 of the magnetic tape cartridge 20. In the example shown in FIG. 14, the identifier 46 is displayed on a surface of a rear wall 36C of the case 36. The identifier 46 includes the two-dimensional matrix image 46C. The two-dimensional matrix image 46C is a two-dimensional image indicating information for identifying the magnetic tape cartridge 20 (for example, a serial number for managing the magnetic tape cartridge 20, given by the user). The two-dimensional matrix image 46C is an example of a "two-dimensional matrix image" according to the technique of the present disclosure.

As described above, in the cartridge management system 10 according to the modification example 2, the identifier 46 includes the two-dimensional matrix image 46C. Therefore, according to this configuration, the magnetic tape cartridge 20 is easily identified. For example, the magnetic tape cartridge 20 is easily identified, compared to a case where the identifier 46 is composed only of a character string.

In the modification example 2, although a form example where the identifier 46 includes the two-dimensional matrix image 46C has been described, the technique of the present disclosure is not limited thereto. For example, an aspect where the identifier 46 includes the barcode 46A along with the two-dimensional matrix image 46C may be made. Alternatively, an aspect where the identifier 46 includes a dot code instead of the two-dimensional matrix image 46C and the barcode 46A or along with the two-dimensional matrix image 46C and the barcode 46A may be made.

In the above-described embodiment, although a form example where the label 72 has the pressure-sensitive adhesive layer 72A, and the label 72 is attached to the magnetic tape cartridge 20 via the pressure-sensitive adhesive layer 72A has been described, the technique of the present disclosure is not limited thereto. For example, the label 72 may be attached to the magnetic tape cartridge 20 in such a manner that a double-sided tape separate from the label 72 is attached to a back surface of the substrate 72B of the label 72. The label 72 may not have the pressure-sensitive adhesive layer 72A, and the label 72 may be fixed to the magnetic tape cartridge 20 by a fastening member (for example, a screw).

In the above-described embodiment, although a form example where the label 72 is peeled off from the mount 73 and is attached to the magnetic tape cartridge 20 has been described, the technique of the present disclosure is not limited thereto. The label 72 may already be attached to the magnetic tape cartridge 20 at the time of factory shipment.

In the above-described embodiment, although a form example where the cartridge management system 10 comprises the magnetic tape library 12, the library controller 14, and the host computer 16 has been described, the technique of the present disclosure is not limited thereto. An aspect where the magnetic tape library 12 is controlled by one external control device having the same functions as the host computer 16 and the library controller 14 may be made. An aspect where the magnetic tape library 12 comprises one control device having the same functions as the host computer 16 and the library controller 14 may be made.

In the above-described embodiment, although a form example where the reading control processing program 58A is stored in the storage 58 has been described, the technique of the present disclosure is not limited thereto. For example, the reading control processing program 58A may be stored in a portable storage medium, such as an SSD or a USB memory. The storage medium is a non-transitory computer readable storage medium. The reading control processing program 58A that is stored in the storage medium is installed on the computer 15 of the library controller 14. The processor 56 executes the reading control processing following the reading control processing program 58A.

In the above-described embodiment, although the computer 15 is illustrated, the technique of the present disclosure is not limited thereto, and a device including an ASIC, an FPGA, and/or a PLD may be applied instead of the computer 15. A combination of a hardware configuration and a software configuration may be used instead of the computer 15.

As the hardware resource that executes the reading control processing described in the above-described embodiment, various processors described below can be used. Examples of the processors include a CPU that is a general-purpose processor configured to execute software, that is, a program to function as the hardware resource that executes the reading control processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor executes the reading control processing using the memory.

The hardware resource that executes the reading control processing may be configured with one of various processors or may be configured with a combination of two or more processors (for example, a combination of a plurality of FPGAs or a combination of a CPU and an FPGA) of the same type or different types. The hardware resource that executes the reading control processing may be one processor.

As an example where the hardware resource is configured with one processor, first, there is a form in which one processor is configured with a combination of one or more CPUs and software, and the processor functions as the hardware resource that executes the reading control processing. Second, as represented by SoC or the like, there is a form in which a processor that realizes the functions of the entire system including a plurality of hardware resources for executing the reading control processing in one IC chip is used. In this way, the reading control processing is realized using one or more of various processors described above as the hardware resource.

In addition, as the hardware structure of various processors, more specifically, an electric circuit into which circuit elements, such as semiconductor elements, are combined can be used. The above-described processing is just an example. Accordingly, it goes without saying that unnecessary steps may be deleted, new steps may be added, or a processing order may be changed without departing from the gist.

The described contents and the illustrated contents are detailed explanations of a part according to the technique of the present disclosure, and are merely examples of the technique of the present disclosure. For example, the above description relating to configurations, functions, operations, and advantageous effects is description relating to an example of configurations, functions, operations, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and from the content of the drawings.

In the present specification, "A and/or B" is synonymous with "at least one of A or B." That is, "A and/or B" may refer to A alone, B alone, or a combination of A and B. Furthermore, in the present specification, a similar concept to "A and/or B" applies to a case in which three or more matters are expressed by linking the matters with "and/or".

All cited documents, patent applications, and technical standards described in the present specification are incorporated by reference in the specification to the same extent as in a case where each individual cited document, patent application, or technical standard is specifically and individually indicated to be incorporated by reference.

In regard to the above-described embodiment, the following supplementary notes will be further disclosed.

Supplementary Note 1

A magnetic tape cartridge comprising:
a label provided on a front surface of a case,
in which the label includes
a coat layer that is formed on a front surface of a substrate attached to the case and scatters light reflected by the label with control of a surface shape and on which an identifier for identifying the magnetic tape cartridge is printed, and with the control of the surface shape, the coat layer has an average period of surface protrusions equal to or smaller than 400 μm.

Supplementary Note 2

The magnetic tape cartridge according to Supplementary Note 1,
in which, with the control of the surface shape, the coat layer has a surface protrusion height equal to or greater than a predetermined value in a surface protrusion height distribution.

Supplementary Note 3

The magnetic tape cartridge according to Supplementary Note 2,
in which the coat layer has a surface protrusion height equal to or greater than 10 μm in the surface protrusion height distribution.

Supplementary Note 4

The magnetic tape cartridge according to any one of Supplementary Note 1 to Supplementary Note 3,
in which, with the control of the surface shape, the coat layer has glossiness equal to or smaller than 7.

Supplementary Note 5

The magnetic tape cartridge according to any one of Supplementary Note 1 to Supplementary Note 4,
in which the control of the surface shape includes addition of particles to the coat layer, and
the particles have an average particle diameter equal to or greater than 10 μm.

Supplementary Note 6

The magnetic tape cartridge according to Supplementary Note 5,
in which the particles are $SiO_2$ particles.

Supplementary Note 7

The magnetic tape cartridge according to any one of Supplementary Note 1 to Supplementary Note 6,
in which the identifier includes a one-dimensional image and/or a two-dimensional matrix image.

Supplementary Note 8

A label for magnetic tape cartridge identification comprising:
a substrate attached to a case of a magnetic tape cartridge; and
a coat layer that is formed on a front surface of the substrate and scatters light reflected by the label for magnetic tape cartridge identification with control of a surface shape and on which an identifier for identifying the magnetic tape cartridge is printed,
in which, with the control of the surface shape, the coat layer has an average period of surface protrusions equal to or smaller than 400 μm.

What is claimed is:

1. A magnetic tape cartridge comprising:
a label affixed on a front surface of a case via an adhesive layer or an adhesive portion,
wherein the label includes
a coat layer that is formed on a front surface of a separate substrate attached to the case and scatters light reflected by the label with control of a surface shape and on which an identifier for identifying the magnetic tape cartridge is printed, and
with the control of the surface shape, the coat layer has an average period of surface protrusions equal to or smaller than 400 μm and includes a binder and particles dispersed in the binder.

2. The magnetic tape cartridge according to claim 1,
wherein, with the control of the surface shape, the coat layer has a surface protrusion height equal to or greater than a predetermined value in a surface protrusion height distribution.

3. A magnetic tape cartridge, comprising:
a label provided on a front surface of a case,
wherein the label includes a coat layer that is formed on a front surface of a substrate attached to the case and scatters light reflected by the label with control of a surface shape and on which an identifier for identifying the magnetic tape cartridge is printed,
wherein, with the control of the surface shape, the coat layer has an average period of surface protrusions equal to or smaller than 400 μm,
wherein, with the control of the surface shape, the coat layer has a surface protrusion height equal to or greater than a predetermined value in a surface protrusion height distribution, and
wherein the coat layer has a surface protrusion height equal to or greater than 10 μm in the surface protrusion height distribution.

4. A magnetic tape cartridge, comprising:
a label provided on a front surface of a case,
wherein the label includes a coat layer that is formed on a front surface of a substrate attached to the case and scatters light reflected by the label with control of a surface shape and on which an identifier for identifying the magnetic tape cartridge is printed,
wherein, with the control of the surface shape, the coat layer has an average period of surface protrusions equal to or smaller than 400 μm, and
wherein, with the control of the surface shape, the coat layer has glossiness equal to or smaller than 7.

5. A magnetic tape cartridge, comprising:
a label provided on a front surface of a case,
wherein the label includes a coat layer that is formed on a front surface of a substrate attached to the case and scatters light reflected by the label with control of a surface shape and on which an identifier for identifying the magnetic tape cartridge is printed,
wherein, with the control of the surface shape, the coat layer has an average period of surface protrusions equal to or smaller than 400 μm,
wherein the control of the surface shape includes addition of particles to the coat layer, and
wherein the particles have an average particle diameter equal to or greater than 10 μm.

6. The magnetic tape cartridge according to claim 5,
wherein the particles are $SiO_2$ particles.

7. The magnetic tape cartridge according to claim 1,
wherein the identifier includes a one-dimensional image and/or a two-dimensional matrix image.

8. A label for magnetic tape cartridge identification comprising:
a separate substrate attached to a case of a magnetic tape cartridge; and
a coat layer that is formed on a front surface of the substrate and scatters light reflected by the label for magnetic tape cartridge identification with control of a surface shape and on which an identifier for identifying the magnetic tape cartridge is printed,
wherein, the label is affixed on a front surface of the case via an adhesive layer or an adhesive portion, and
with the control of the surface shape, the coat layer has an average period of surface protrusions equal to or smaller than 400 μm and includes a binder and particles dispersed in the binder.

9. A cartridge identification label for attachment to a case of a magnetic tape cartridge, the label comprising:
a coated layer on which an identifier is printed, the coat layer satisfying at least one of the following (a) to (c):
(a) an average interval of surface protrusions is equal to or smaller than 400 μm,
(b) a protrusion height distribution includes protrusion heights equal to or higher than 10 μm, or
(c) glossiness is equal to or smaller than 7.

* * * * *